US012809344B2

(12) United States Patent
Gonzalez et al.

(10) Patent No.: US 12,809,344 B2

(45) Date of Patent: *Nov. 24, 2026

(54) METHODS AND SYSTEMS FOR SELECTING AND PRE-FEEDING FASTENERS INTO AUTOMATED DRILLING MACHINES

(71) Applicant: The Boeing Company, Chicago, IL (US)

(72) Inventors: Amelia R. Gonzalez, Charleston, SC (US); Richard Agudelo, Mount Pleasant, SC (US); Michael Rojas, Summerville, SC (US); Gabrielle Forgione, Charleston, SC (US); Benjamin B. Warner, Charleston, SC (US); Skye Jenkins, Snohomish, WA (US); Benjamin Christain Culver, III, Lynwood, WA (US)

(73) Assignee: The Boeing Company, Chicago, IL (US)

( * ) Notice: Subject to any disclaimer, the term of this patent is extended or adjusted under 35 U.S.C. 154(b) by 447 days.

This patent is subject to a terminal disclaimer.

(21) Appl. No.: 18/493,670

(22) Filed: Oct. 24, 2023

(65) Prior Publication Data

US 2024/0053730 A1 Feb. 15, 2024

Related U.S. Application Data

(63) Continuation of application No. 17/463,880, filed on Sep. 1, 2021, now Pat. No. 11,841,697.

(Continued)

(51) Int. Cl.

| | |
|---|---|
| ***G05B 19/4155*** | (2006.01) |
| ***B21J 15/28*** | (2006.01) |

(Continued)

(52) U.S. Cl.

CPC .......... *G05B 19/4155* (2013.01); *B21J 15/28* (2013.01); *G05B 13/0265* (2013.01);

(Continued)

(58) Field of Classification Search

CPC ........... G05B 19/4155; G05B 13/0265; G05B 19/18; G05B 19/404; G05B 2219/41109;

(Continued)

(56) References Cited

U.S. PATENT DOCUMENTS

| | | | |
|---|---|---|---|
| 10,160,082 | B2 | 12/2018 | Agudelo |
| 10,195,708 | B2 | 2/2019 | Agudelo |

(Continued)

FOREIGN PATENT DOCUMENTS

| | | | |
|---|---|---|---|
| EP | 2703654 | A1 | 3/2014 |
| EP | 2915610 | A1 | 9/2015 |
| WO | 2007038740 | A2 | 4/2007 |

OTHER PUBLICATIONS

U.S. Appl. No. 17/463,880, USPTO e-Office Action: CTNF—Non-Final Rejection, Feb. 3, 2023, 21 pages.

(Continued)

*Primary Examiner* — Jonathan Michael Skrzycki

(74) *Attorney, Agent, or Firm* — Yee & Associates, P.C.

(57) ABSTRACT

Described herein are methods and manufacturing systems that select fasteners for pre-feeding and, in some examples, pre-feed the selected fasteners. These methods involve aggregating historical manufacturing data, comprising hole identifications and fastener grip lengths, previously selected for these hole identifications. A specific grip length and a corresponding fastener repeatability rating are then determined for each hole identification from this historical manufacturing data. For example, a specific grip length corresponds to the most frequently selected grip length for this hole identification. In some examples, the historical manu- (Continued)

facturing data is analyzed using machine learning. The fastener repeatability rating is compared to an operating threshold, in some examples, to determine if the corresponding grip length should be selected for a particular hole location. This grip length selection is then used for pre-feeding a corresponding fastener into an automated drilling machine, thereby saving significant processing time relative to conventional processes.

20 Claims, 12 Drawing Sheets

Related U.S. Application Data

(60) Provisional application No. 63/088,674, filed on Oct. 7, 2020.

(51) Int. Cl.
*G05B 13/02* (2006.01)
*G05B 19/18* (2006.01)
*G05B 19/404* (2006.01)

(52) U.S. Cl.
CPC ............ *G05B 19/18* (2013.01); *G05B 19/404* (2013.01); *G05B 2219/41109* (2013.01)

(58) Field of Classification Search
CPC ........ G05B 19/188; G05B 2219/36201; G05B 19/401; G05B 2219/36254; G05B 2219/45129; G05B 2219/50378; B21J 15/28; B21J 15/142; B21J 15/32; B64F 5/10
See application file for complete search history.

(56) References Cited

U.S. PATENT DOCUMENTS

| | | | | |
|---|---|---|---|---|
| 11,841,697 | B2 | 12/2023 | Gonzalez et al. | |
| 2007/0180674 | A1* | 8/2007 | Morden ................... | B21J 15/32<br>29/407.01 |
| 2012/0144219 | A1 | 6/2012 | Salahshour et al. | |
| 2013/0072781 | A1 | 3/2013 | Omernick et al. | |
| 2015/0277432 | A1 | 10/2015 | Ikeda et al. | |
| 2018/0264653 | A1 | 9/2018 | Fadlovich et al. | |
| 2019/0382135 | A1 | 12/2019 | Gonzalez et al. | |
| 2020/0216198 | A1 | 7/2020 | Engelbart et al. | |
| 2021/0302145 | A1* | 9/2021 | Olson ...................... | G01B 3/20 |
| 2022/0107627 | A1 | 4/2022 | Gonzalez et al. | |

OTHER PUBLICATIONS

U.S. Appl. No. 17/463,880, USPTO e-Office Action: EXIN—Examiner Interview Summary Record (Ptol-413), Jul. 31, 2023, 1 page.
U.S. Appl. No. 17/463,880, USPTO e-Office Action: NOA—Notice Of Allowance And Fees Due (Ptol-85), Jul. 31, 2023, 8 pages.
European Application Serial No. 21200572.2, Search Report dated Feb. 23, 2022, 8 pages.

* cited by examiner 150 152 156

| Hole ID | Grip Length |
|---|---|
| 1 | $L_2$ |
| 2 | $L_2$ |
| 3 | $L_4$ |
| 4 | $L_5$ |

| Hole ID | Specific Grip Length | Fastener Repeatability Rating |
|---|---|---|
| 1 | $L_2$ | 87% |
| 2 | $L_2$ | 80% |
| 3 | $L_4$ | 92% |
| 4 | $L_5$ | 89% |

+

| Hole Location |
|---|
| 1 |
| 2 |
| 3 |

+

| Operating Threshold |
|---|
| 75% |
| 75% |
| 75% |

| Hole Location | Specific Grip Length |
|---|---|
| 1 | $L_2$ |
| 2 | $L_2$ |
| 3 | $L_4$ |

Historical Manufacturing Data 150

162, 166

| Reference Processing Location | Reference Processing Parameter |
|---|---|
| 1 | $X_1$ |
| 2 | $X_2$ |
| 3 | $X_4$ |

Operating Data 170

163, 167, 169

| Processing Location | Specific Processing Parameter | Parameter Repeatability Rating |
|---|---|---|
| 1 | $X_1$ | 87% |
| 2 | $X_1$ | 80% |
| 3 | $X_1$ | 92% |

METHODS AND SYSTEMS FOR SELECTING AND PRE-FEEDING FASTENERS INTO AUTOMATED DRILLING MACHINES

CROSS-REFERENCE TO RELATED APPLICATIONS

This application claims the benefit under 35 U.S.C. § 120 of U.S. patent application Ser. No. 17/463,880, filed on Sep. 1, 2021, and issued as U.S. Pat. No. 11,841,697 issued on Dec. 12, 2023, which claims priority to U.S. Provisional Patent Application 63/088,674, filed on Oct. 7, 2020, which applications are incorporated herein by reference in their entirety for all purposes.

BACKGROUND

Automated drilling machines are extensively used in manufacturing, such as aircraft manufacturing. In some instances, automated drilling machines are also used to determine fasteners for feeding from fastener storage systems to end effectors for insertion into corresponding holes. Numerical control (NC) programs are used to instruct these machines which fastener type or, more specifically, which fastener grip length is intended for each hole in the processed parts. However, due to part-specific thickness variabilities, tolerance buildups, and other such factors, the design grip length may not be suitable for the corresponding hole. To mitigate this issue, a conventional process typically involves measuring the stack thickness corresponding to each hole (e.g., using a probe). This measurement is then used to determine the grip length for this specific hole. However, due to this measurement, the automated drilling machine must wait about 10 seconds before a fastener can be fed for installation. This inspection delay slows down the overall process and is undesirable.

SUMMARY

Described herein are methods and manufacturing systems that select fasteners for pre-feeding and, in some examples, pre-feed the selected fasteners. These methods involve aggregating historical manufacturing data, comprising hole identifications and fastener grip lengths, previously selected for these hole identifications. A specific grip length and a corresponding fastener repeatability rating are then determined for each hole identification from this historical manufacturing data. For example, a specific grip length corresponds to the most frequently selected grip length for this hole identification. In some examples, the historical manufacturing data is analyzed using machine learning. The fastener repeatability rating is compared to an operating threshold, in some examples, to determine if the corresponding grip length should be selected for a particular hole location. This grip length selection is then used for pre-feeding a corresponding fastener into an automated drilling machine, thereby saving significant processing time relative to conventional processes In some examples, a method for selecting fasteners for predictively pre-feeding into an automated drilling machine is provided. The method comprises, at a manufacturing data center, receiving historical manufacturing data comprising hole identifications and fastener grip lengths. Each of the fastener grip lengths is previously selected for a corresponding one of the hole identifications. The method proceeds with, at the manufacturing data center, determining, from the historical manufacturing data and for each of the hole identifications, a specific grip length of the fastener grip lengths and a fastener repeatability rating, corresponding to the specific grip length. The method comprises receiving holes locations, each corresponding to one of the hole identifications, and selecting, for each of the hole locations, the specific grip length when the fastener repeatability rating, corresponding to the specific grip length, exceeds an operating threshold.

In some examples, a method for selecting processing parameters for operating an automated machine is provided. The method comprises, at a manufacturing data center, receiving historical manufacturing data comprising reference processing locations and reference processing parameters. Each of the reference processing parameters is previously selected for a corresponding one of the reference processing locations. The method proceeds with, at the manufacturing data center, determining, from the historical manufacturing data and for each of the reference processing locations, a specific processing parameter of the reference processing parameters and a parameter repeatability rating, corresponding to the specific processing parameter. The method comprises receiving processing locations, each corresponding to one of the reference processing locations, and selecting the specific processing parameter for each of the processing locations when the parameter repeatability rating, corresponding to the specific processing parameter, exceeds an operating threshold.

In some examples, a manufacturing system comprises a manufacturing data center, comprising a historical data store, configured to receive and store historical manufacturing data from an automated drilling machine, the historical manufacturing data comprising hole identifications and fastener grip lengths, each of the fastener grip lengths previously selected for a corresponding one of the hole identifications. The manufacturing data center also comprises a scoring engine, configured to determine, from the historical manufacturing data and for each of the hole identifications, a specific grip length of the fastener grip lengths and a fastener repeatability rating, corresponding to the specific grip length. The manufacturing data center further comprises an operating data store, configured to store the specific grip length and the fastener repeatability rating for each of the hole identifications.

DETAILED DESCRIPTION

In the following description, numerous specific details are outlined to provide a thorough understanding of the presented concepts. In some examples, the presented concepts are practiced without some or all of these specific details. In other examples, well-known process operations have not been described in detail to not unnecessarily obscure the described concepts. While some concepts will be described in conjunction with the specific examples, it will be understood that these examples are not intended to be limiting.

Introduction

Described herein are methods and manufacturing systems, which select fasteners for pre-feeding. In some examples, the selected fasteners are also pre-fed into automated drilling machines and even installed by these machines. These methods and systems provide substantial time savings (e.g., about 10 seconds per fastener) over conventional processes, thereby significantly improving the overall processing speeds. These time savings are achieved by eliminating the need to measure a stack thickness corresponding to each hole, prior to selecting a specific grip length. Instead, a specific grip length is selected for each hole location based on historical manufacturing data, previously aggregated for these hole locations.

Specifically, the historical manufacturing data comprises hole identifications and fastener grip lengths, selected for these hole identifications. The historical manufacturing data is aggregated for multiple processed parts, recording each fastener grip length selected for these parts. In some examples, the historical manufacturing data is continuously aggregated such that the specific grip length, selected based on each hole location in the described method, becomes a part of the historical manufacturing data for the next iterations of this method.

The specific grip length is selected using various methods, including machine learning of the historical manufacturing data. For example, a numerical count of all instances, when each grip length has been previously selected, is used. Different instances may be assigned different weight coefficients, e.g., based on the time passed since the previous selection, the part type, and/or the selection type (e.g., if based on actual inspection). In more specific examples, the historical manufacturing data is used to determine the fastener grip length and the fastener repeatability rating for each hole location.

In some examples, the fastener grip selection involves comparing the fastener repeatability rating to an operating threshold to determine if the corresponding grip length should be selected for a particular hole location. The operating threshold may be selected based on various parameters, such as needed precision, part costs, rework cost, and the like. In some examples, the operating threshold varies for different hole locations.

Figure 1A:
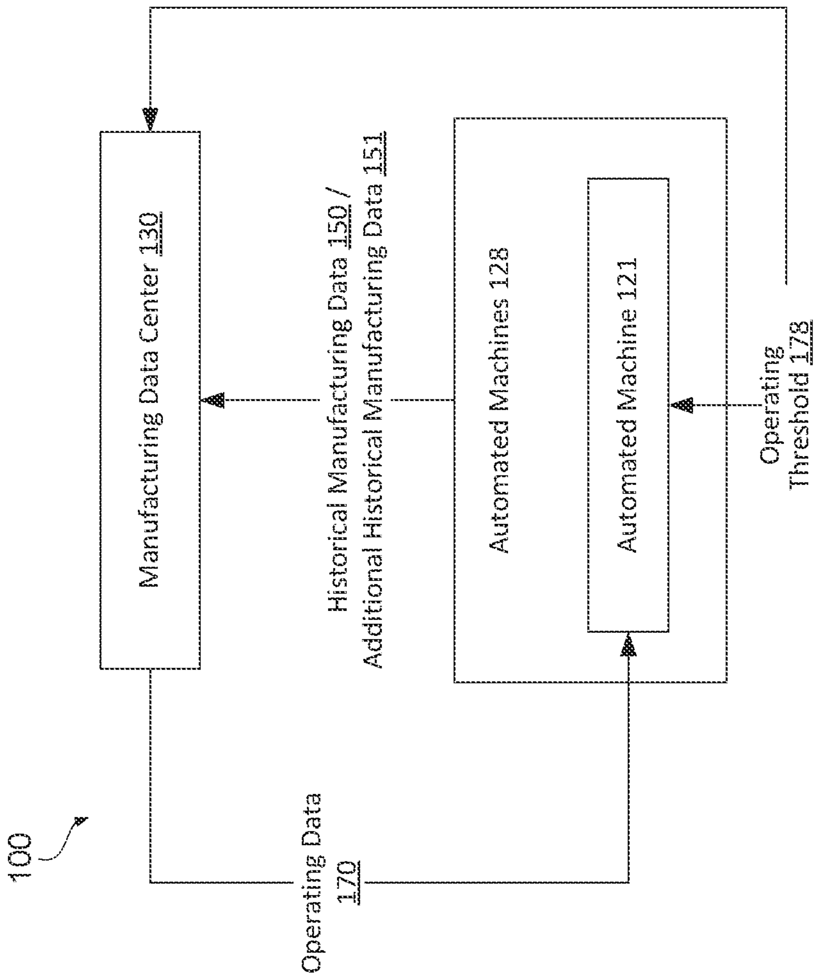
FIG. 1A and FIG. 1B are schematic illustrations of two examples of a manufacturing system, illustrating components of this system and data flows among these components, in accordance with some examples.
Figure 1B:
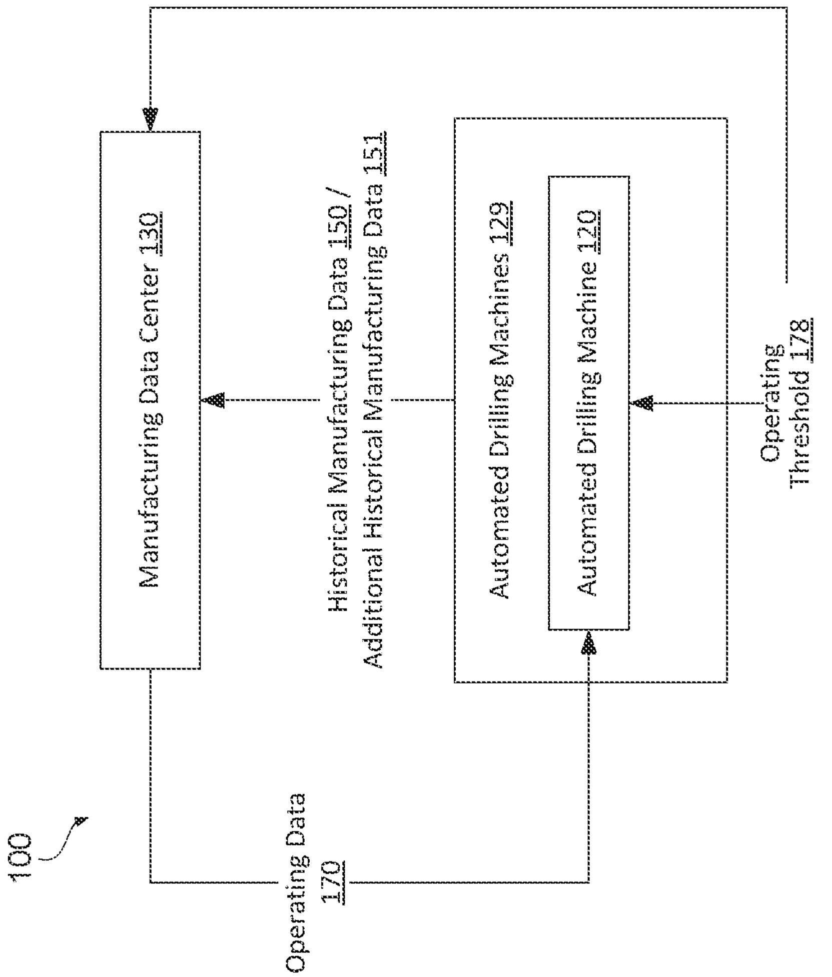

Various aspects of fastener pre-feeding will now be introduced with reference to FIGS. 1A, 1B, 2A, 2B, 3, 4A, and 4B. Specifically, FIG. 1A and FIG. 1B are schematic illustrations of two examples of manufacturing system 100. In both examples, manufacturing system 100 comprises manufacturing data center 130, which receives historical manufacturing data 150. Manufacturing data center 130 stores historical manufacturing data 150 and also uses historical manufacturing data 150 to generate operating data 170. In some examples, historical manufacturing data 150 is supplemented with additional historical manufacturing data 151, e.g., as a part of the ongoing machine learning process. Furthermore, in some examples, operating data 170 is periodically revised as historical manufacturing data 150 is supplemented.

FIG. 1A also illustrates automated machines 128, communicatively coupled to manufacturing data center 130. Automated machines 128 generate historical manufacturing data 150 during the operation of these machines. Furthermore, automated machines 128 supply historical manufacturing data 150 to manufacturing data center 130, for generating operating data 170. Operating data 170 is then used by at least one of automated machines 128 (e.g., automated machine 121, identified in FIG. 1A) for selecting processing parameters for operating automated machine 121.

FIG. 1B illustrates a more specific example with automated drilling machines 129. In some examples, automated drilling machines 129 are specific examples of automated machines 128, e.g., configured for installing fasteners. Similar to automated machines 128 in FIG. 1A, automated drilling machines 129 in FIG. 1B are communicatively coupled with manufacturing data center 130. Automated drilling machines 129 generate historical manufacturing data 150 during the operation of these machines. Furthermore, automated drilling machines 129 supply historical manufacturing data 150 to manufacturing data center 130, for generating operating data 170. Operating data 170 is then used by at least one of automated drilling machines 129 (e.g., automated drilling machine 120, identified in FIG. 1B) for selecting processing parameters or, more specifically, for selecting fasteners for predictively pre-feeding into automated drilling machine 120.

The following description focuses on automated drilling machine 120. One having ordinary skill in the art would understand that other automated drilling machines in the group of automated drilling machines 129 would be operated similarly. Furthermore, one having ordinary skills in the art would understand that other examples of automated machines are operable in a similar manner.

Figures 2A, 2B:
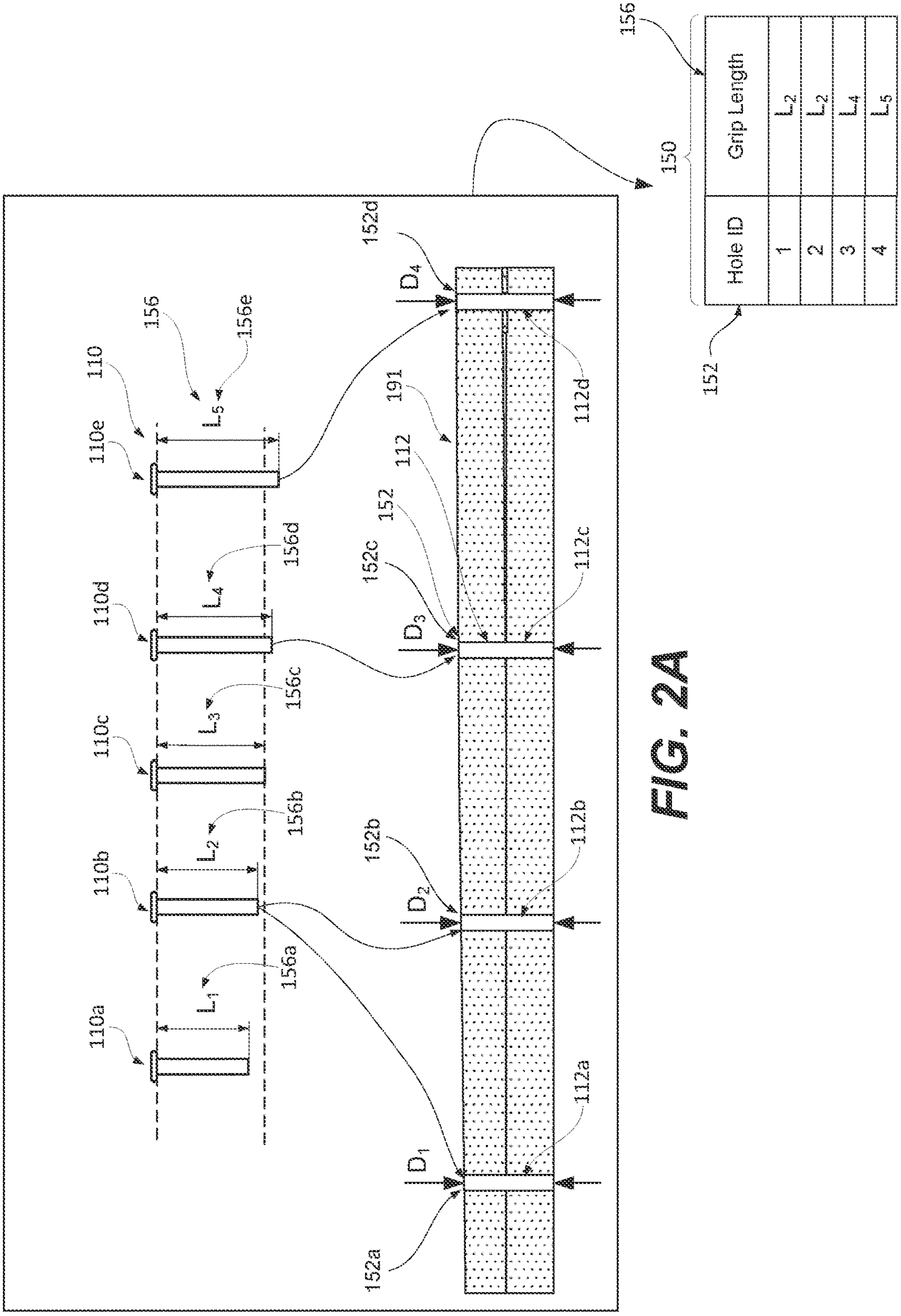
FIG. 2A is a schematic illustration of fasteners, each having a specific fastener grip length, being selected for installation into specific holes, each having a unique hole identification, in accordance with some examples.
FIG. 2B is an example of historical manufacturing data generated based on the fastener selection for each hole shown in FIG. 2A.

FIG. 2A is a schematic illustration of fasteners 110 being selected for installation into specific holes 112 of processed part 191. Various examples of processed part 191 such as aircraft parts or, more specifically, aft body components, other fuselage components, and the like. Each fastener has a specific fastener grip length. For example, first fastener

110*a* has first fastener grip length 156*a* (identified as L1). Second fastener 110*b* has second fastener grip length 156*b* (identified as L2). Third fastener 110*c* has third fastener grip length 156*c* (identified as L3). Fourth fastener 110*d* has fourth fastener grip length 156*d* (identified as L4). Finally, fifth fastener 110*e* has fifth fastener grip length 156*e* (identified as L5). One having ordinary skill in the art would understand that any number of different fastener grip lengths 156 may be associated with fasteners 110. Furthermore, one having ordinary skill in the art would understand that different fasteners 110 may have the same grip length, e.g., the same type of fasteners 110.

Referring to FIG. 2A, processed part 191 comprises multiple holes 112 having corresponding hole identifications 152. For example, first hole 112*a* has first hole identification 152*a*, second hole 112*b* has second hole identification 152*b*, third hole 112*c* has third hole identification 152*c*, and fourth hole 112*d* has fourth hole identification 152*d*. Hole identifications 152 are the same for the same type of parts. In this particular example, second fastener 110*b* was selected for first hole 112*a* and second hole 112*b*, fourth fastener 110*d* was selected for third hole 112*c*, and fifth fastener 110*e* was selected for fourth hole 112*d*. More specifically, fasteners with second fastener grip length 156*b* were selected for first hole identification 152*a* and second hole identification 152*b*. Fourth fastener grip length 156*d* was selected for third hole identification 152*c*, while fifth fastener grip length 156*e* was selected for fourth hole identification 152*d*. This selection forms at least a part of historical manufacturing data 150 as, e.g., is schematically shown in FIG. 2B. Historical manufacturing data 150 comprises hole identifications 152 and fastener grip lengths 156 such that each of fastener grip lengths 156 was previously selected for a corresponding one of hole identifications 152.

Figure 3:
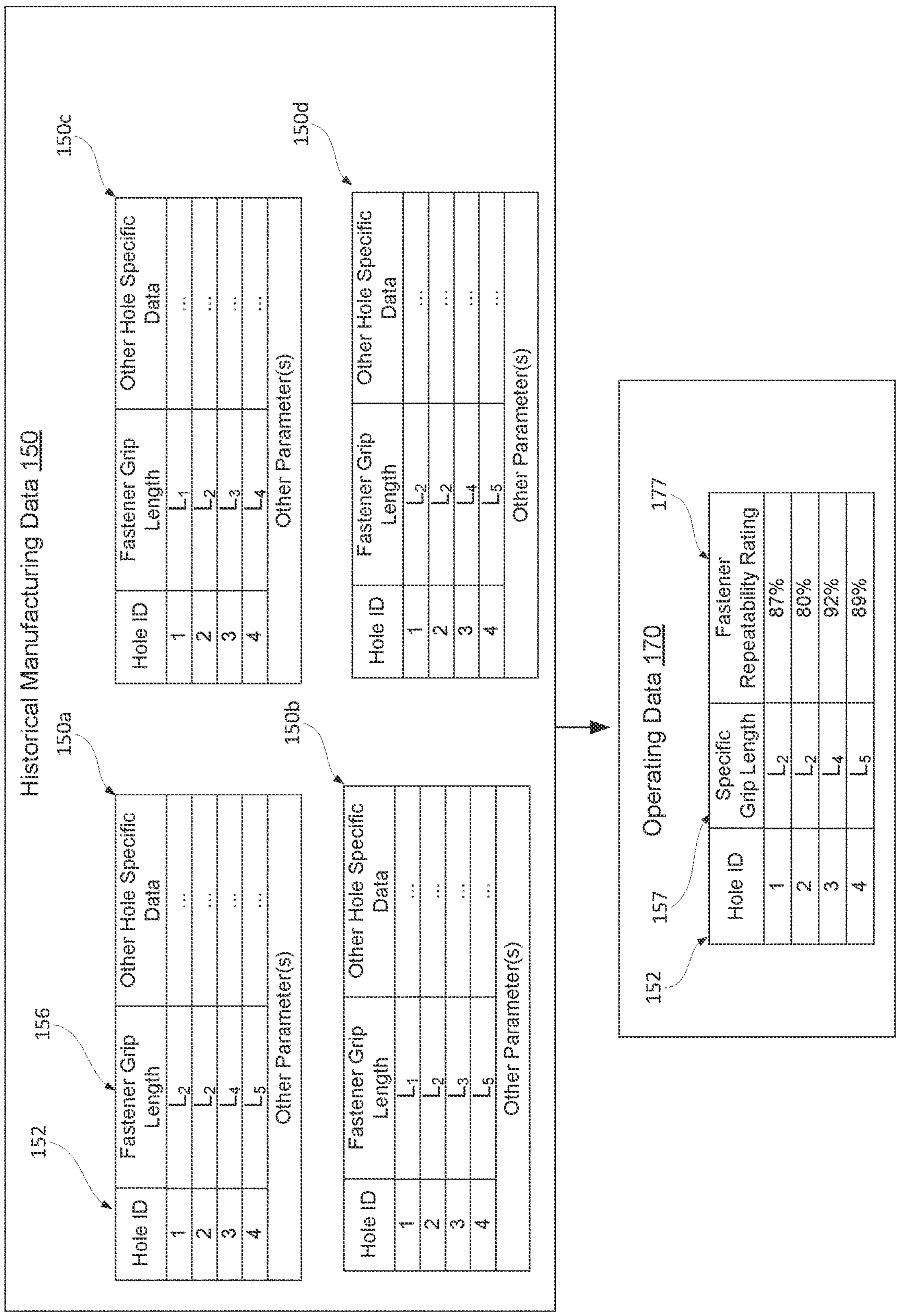
FIG. 3 is a schematic illustration of generating operating data, comprising a specific grip length and a fastener repeatability rating for each hole identification, based on the historical manufacturing data, in accordance with some examples.

FIG. 3 is a schematic illustration of aggregating historical manufacturing data 150 and generating operating data 170, based on historical manufacturing data 150. Historical manufacturing data 150 is aggregated from multiple different parts. Some of these parts are the same type of parts and share at least some common hole identifications. However, in some examples, the same hole identifications are shared by different part types.

As schematically shown in FIG. 3, historical manufacturing data 150 comprises multiple historical manufacturing data batches 150*a*-150*d*. These data batches correspond to different processed parts, which may be processed by the same or different automated drilling machines. In some examples, fastener grip lengths 156, previously selected for corresponding hole identifications 152, are the same for different data batches, e.g., first historical manufacturing data batch 150*a* and fourth historical manufacturing data batch 150*d*. However, in some examples, different fastener grip lengths 156 are selected for the same hole identification. For example, first historical manufacturing data batch 150*a* and fourth historical manufacturing data batch 150*d* indicate that the first hole location (identified as "1") had a second fastener grip length (identified as "$L_2$") selected. On the other hand, second historical manufacturing data batch 150*b* and third historical manufacturing data batch 150*c* indicate that the first hole location (identified as "1") had a first fastener grip length (identified as "$L_1$") selected. This difference is attributed to various process variability factors, such as stack thickness.

As noted above, historical manufacturing data 150 is collectively used to generate operating data 170, which comprises specific grip length 157 and fastener repeatability rating 177 for each of hole identifications 152. Various aspects of this operation are described below with reference to FIG. 6. In some examples, specific grip length 157 represents the most common grip length, which has been previously selected for this particular hole identification. Fastener repeatability rating 177 depends on the process variability, e.g., how frequently any other grip lengths have been previously selected for this particular hole identification.

Figure 4A:
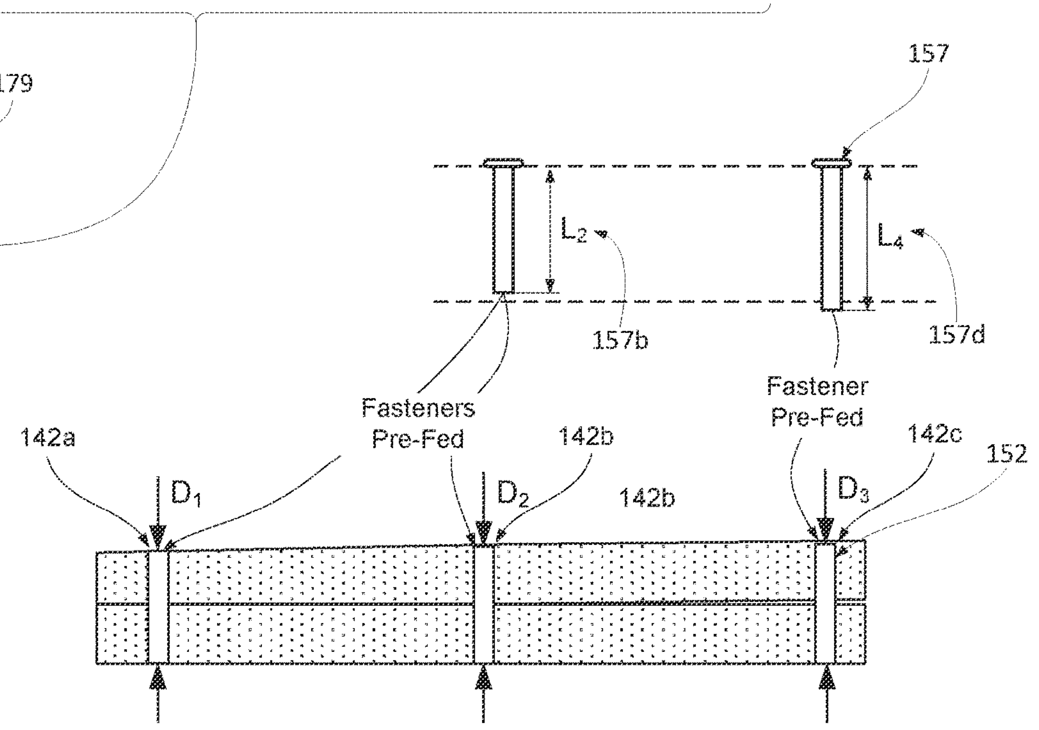
FIGS. 4A and 4B are two examples of selecting a specific grip length for each hole location, based on a corresponding fastener repeatability rating and an operating threshold, in accordance with some examples.
Figure 4B:
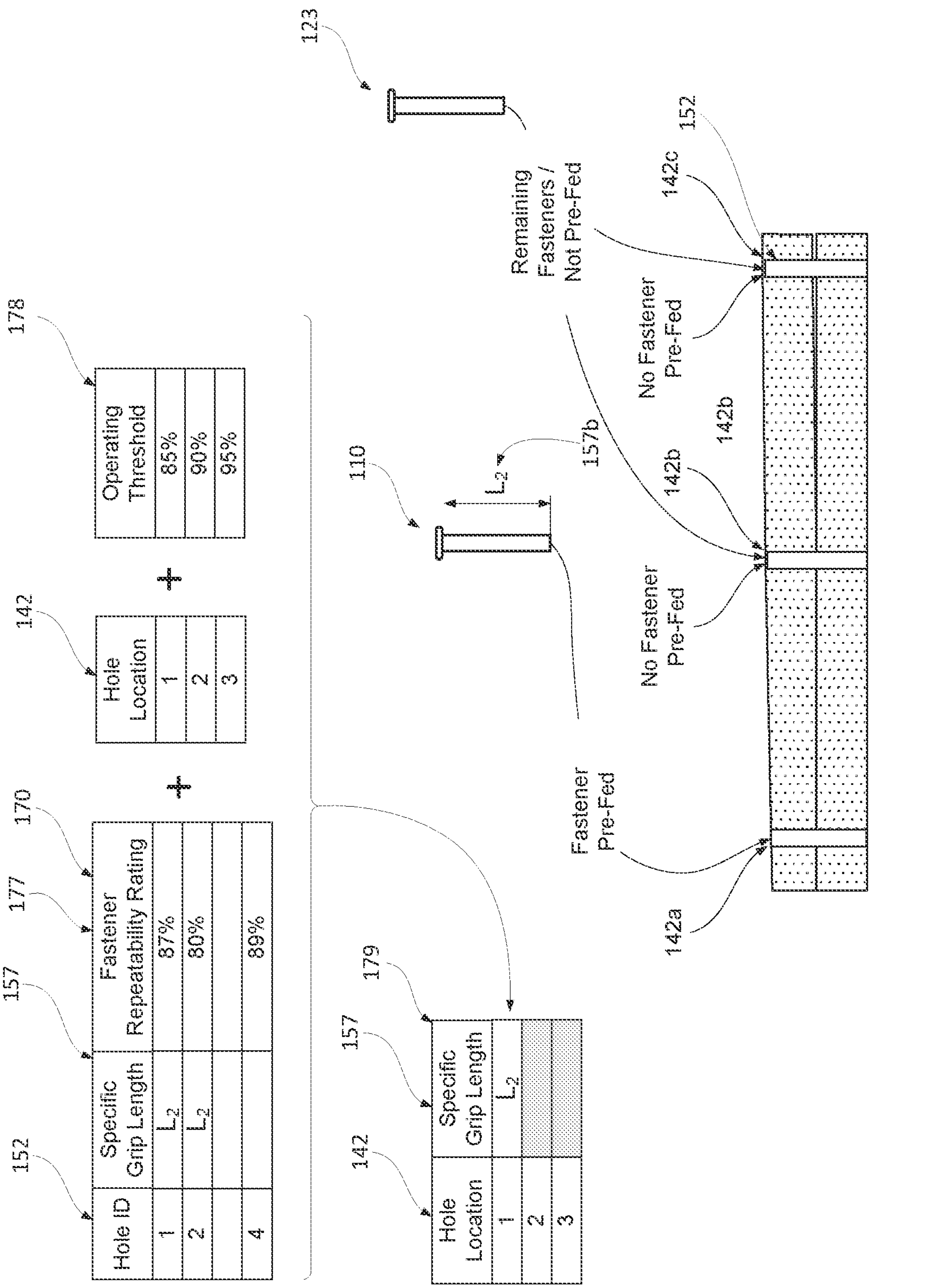

FIGS. 4A and 4B are two examples of selecting specific grip length 157 for each of hole locations 142, based on corresponding fastener repeatability rating 177 and operating threshold 178, in accordance with some examples. In some examples, hole locations 142 correspond to hole identifications 152. However, in some examples such as shown in FIG. 4B, some of hole locations 142 do not have a corresponding one of the hole identifications 152 (e.g., historical manufacturing data 150 has not been previously received for this hole location). In the same or other examples and as shown in FIG. 4A, some of hole identifications 152 (e.g., hole identification number 4) do not have corresponding hole locations 142 (e.g., historical manufacturing data 150 represents multiple different part types having different sets of hole identifications 152).

Various aspects of selecting specific grip length 157 for each of hole locations 142 are described below with reference to FIG. 6. In some examples, fastener repeatability rating 177 for a given hole location is compared to operating threshold 178 (e.g., specific for this hole location or global for the entire part). If fastener repeatability rating 177 exceeds operating threshold 178, then specific grip length 157, corresponding to fastener repeatability rating 177, is selected for this hole location. FIG. 4A illustrates an example where fastener repeatability rating 177 exceeding operating threshold 178 for each of the first, second, and third hole locations 142. As such, specific grip length 157 is selected for each hole location, e.g., second specific grip length 157*b* for each of first hole location 142*a* and second hole location 142*b*, and fourth specific grip length 157*d* for third hole location 142*c*. In this example, all hole locations 142 will have pre-fed fasteners 110.

Referring to FIG. 4B, fastener repeatability rating 177 exceeds operating threshold 178 only for first hole location 142*a* (i.e., 87%>85%). As such, second specific grip length 157*b* is selected for first hole location 142*a*. For second hole location 142*b*, fastener repeatability rating 177 is less than operating threshold 178 (i.e., 80%<90%). As such, no grip lengths are selected for second hole location 142*b*, and no fasteners will be pre-fed for this hole location. Third hole location 142*c* does not have any corresponding hole identifications in historical manufacturing data 150. As such, no grip lengths are selected for third hole location 142*c*, and no fasteners will be pre-fed for this hole location. In this case, a fastener is selected using a backup process, which comprises, e.g., measuring a stack thickness at third hole location 142*c* and selecting the fastener based on this measured stack thickness. However, as noted above, this measurement slows down the overall process and should be minimized (e.g., by improving the predictive model to produce higher values of fastener repeatability ratings and/or reducing the value of operating threshold 178).

System Examples

Figure 5A:
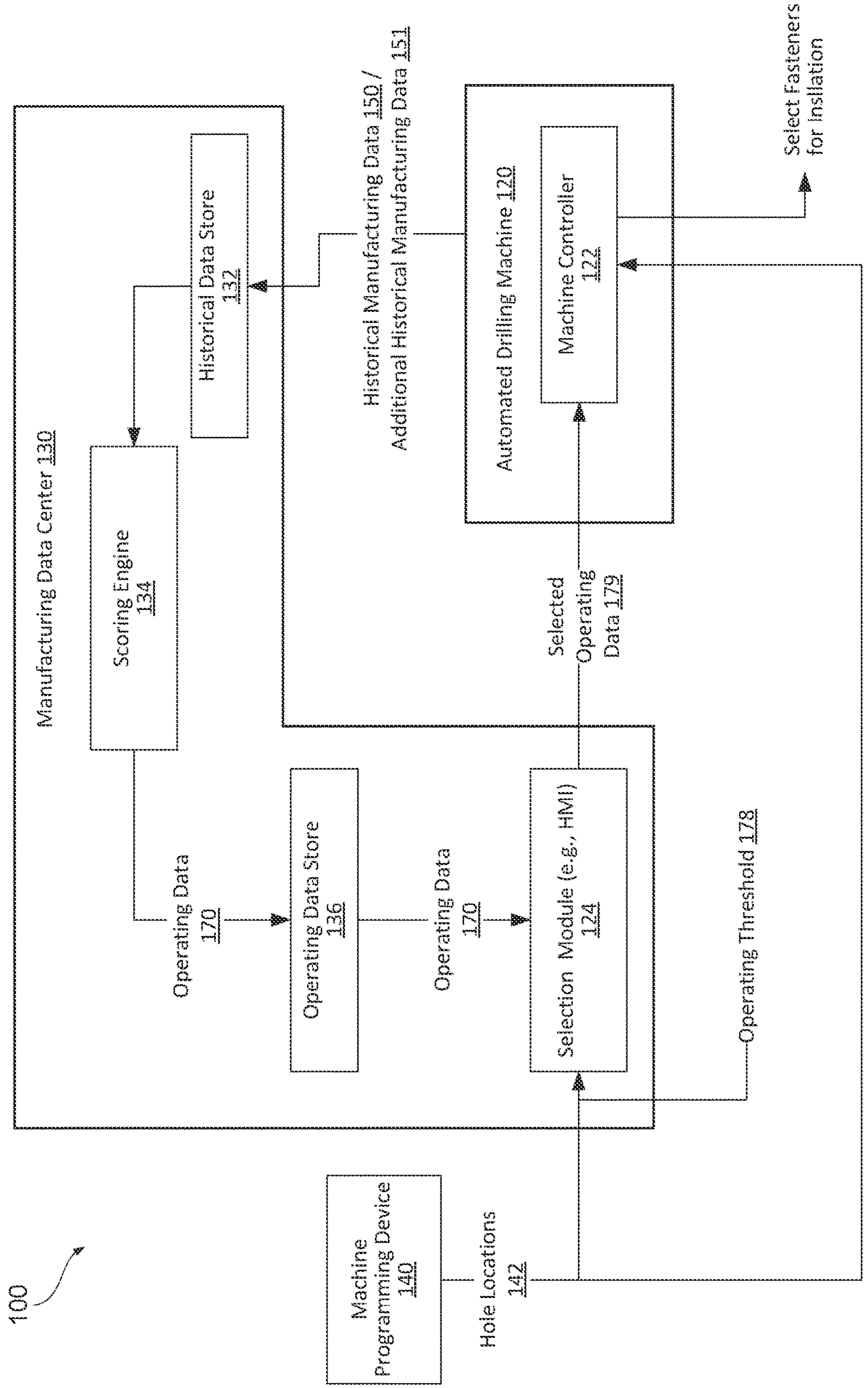
FIG. 5A and FIG. 5B are schematic illustrations of two examples of a manufacturing system, comprising a manufacturing data center and an automated drilling machine and various data flows between these components, in accordance with some examples.
Figure 5B:
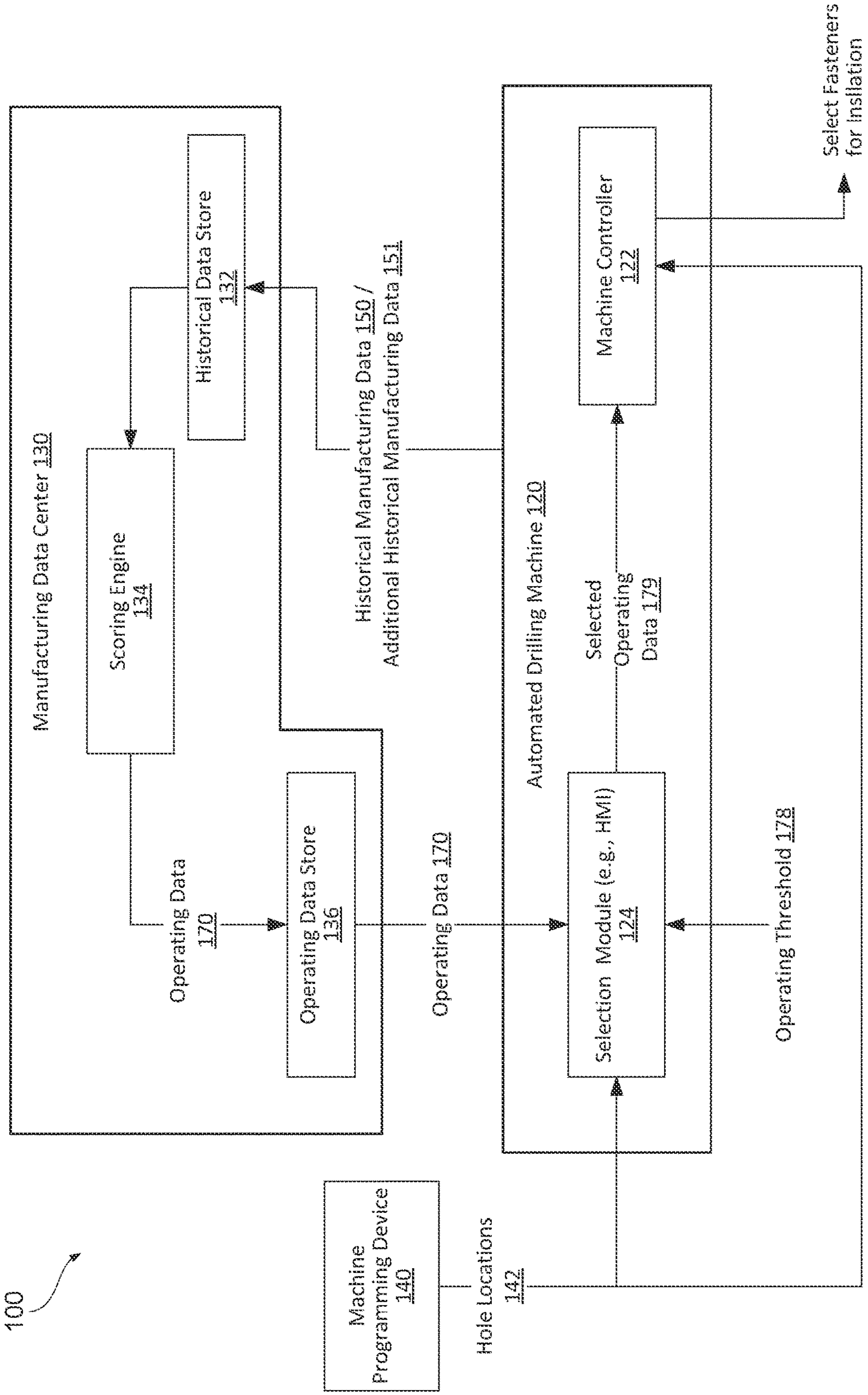

FIG. 5A and FIG. 5B are schematic illustrations of two examples of manufacturing system 100, which is used, e.g., for selecting fasteners 110 for predictively pre-feeding fasteners. Various aspects of this selection method are described below with reference to FIG. 6. Furthermore, different operations of this method may be performed by different components of manufacturing system 100 as described below with reference to FIG. 6. However, these operations drive specific configuration features, which are described herein with reference to FIG. 5A and FIG. 56.

Referring to FIG. 5A, in some examples, manufacturing system 100 comprises manufacturing data center 130, which comprises historical data store 132, scoring engine 134, operating data store 136, and selection module 124. FIG. 5B illustrates an example of manufacturing system 100, in which selection module 124 is a part of automated drilling machine 120. Manufacturing data center 130 is communicatively coupled to automated drilling machine 120 and is configured to receive historical manufacturing data 150 and submit operating data 170 or selected operating data 170 to automated drilling machine 120. Some features of this data transfer are described above with reference to FIG. 1A and FIG. 16.

Historical data store 132 is configured to receive and store historical manufacturing data 150. As described above, historical manufacturing data 150 comprises, for example, hole identifications 152 and fastener grip lengths 156. Each of fastener grip lengths 156 has been previously selected for a corresponding hole identification. In some examples, historical data store 132 is communicatively coupled to machine controllers 122 of automated drilling machine 120.

Scoring engine 134 is configured to determine specific grip length 157 and fastener repeatability rating 177, corresponding to this specific grip length 157. This determination is performed from historical manufacturing data 150, for each hole identification. For example, scoring engine 134 is configured to run at a set interval (e.g., upon the aggregation of additional historical manufacturing data).

The collection of specific grip lengths and fastener repeatability ratings is referred to as operating data 170. In some examples, each hole identification, provided in historical manufacturing data 150 has a corresponding set of specific grip length 157 and fastener repeatability rating 177. However, in some examples, a certain minimum number of previous historical data batches is needed for each hole identification before specific grip length 157 and fastener repeatability rating 177 can be determined.

In some examples, scoring engine 134 uses different models for determining specific grip length 157 and fastener repeatability rating 177. For example, scoring engine 134 selects one of these models depending on the part type and/or other parameters. In these examples, each model is identified with a model revision, creation date, and description. A particular model is selected based on one of these identifications.

Operating data store 136 is configured to store operating data 170, which comprises specific grip length 157 and fastener repeatability rating 177 for each of hole identifications 152. Operating data 170 may also be referred to as predictive model data. In some examples, operating data 170 also comprises the date when specific grip length 157 and fastener repeatability rating 177 were determined and/or a model used for this determination. In some examples, operating data store 136 stores previously used NC programs or at least hole locations 142 corresponding to each of these NC programs.

In some examples, manufacturing system 100 further comprises selection module 124. Selection module 124 is configured to receive holes locations 142. These hole locations are received from machine programming device 140, e.g., from a numerical control (NC) program, supplied by machine programming device 140 to machine controller 122 for controlling operations of automated drilling machine 120. In some examples, selection module 124 is configured to identify hole locations 142 from the NC program.

Furthermore, selection module 124 is configured to select, for each of hole locations 142, specific grip length 157. This selection is performed when fastener repeatability rating 177, corresponding specific grip length 157, exceeds operating threshold 178. In some examples, selection module 124 receives operating threshold 178 as an input. Operating threshold 178 is stored in selection module 124 for upcoming selections of specific grip lengths. In some examples, selection module 124 stores determined operating threshold 178 from various factors such as a historical yield, processing costs, and/or installation costs.

In some examples, selection module 124 is implemented in the form of a human-machine interface (HMI) script. The HMI script is triggered when a new NC program is loaded into machine controller 122. The HMI script gets the name of the loaded NC program and obtains all hole locations 142 (e.g., hole names) from the NC program. More specifically, if the NC program is cached (e.g., in operating data store 136), the HMI script exports hole locations 142 from operating data store 136. Alternatively, if an NC program is new, the NC program exports the NC program content from machine programming device 140 (e.g., an NC Program Server). The HMI script also exports operating data 170 from operating data store 136. As noted above, operating data 170 comprises specific grip length 157 and fastener repeatability rating 177 for each hole location. The HMI script then generates an extensible markup language (XML) file comprising specific grip length 157 for each hole location when fastener repeatability rating 177 for this hole location exceeds operating threshold 178. Finally, the HMI scrip outputs this XML file to machine controller 122. The XML file is one example of selected operating data 179.

In some examples, selection module 124 is a part of manufacturing data center 130. In these examples, selection module 124 is configured to transmit specific grip length 157, selected for each of hole locations 142 to automated drilling machine 120. Alternatively, selection module 124 is a part of automated drilling machine 120. In this example, automated drilling machine 120 receives operating data 170 from manufacturing data center 130 and performs the selection of specific grip lengths internally.

In some examples, manufacturing system 100 further comprises automated drilling machine 120, configured to pre-feed fasteners 110. Each of these fasteners corresponds to specific grip length 157, selected for a corresponding one of hole locations 142.

Method Examples

Figure 6:
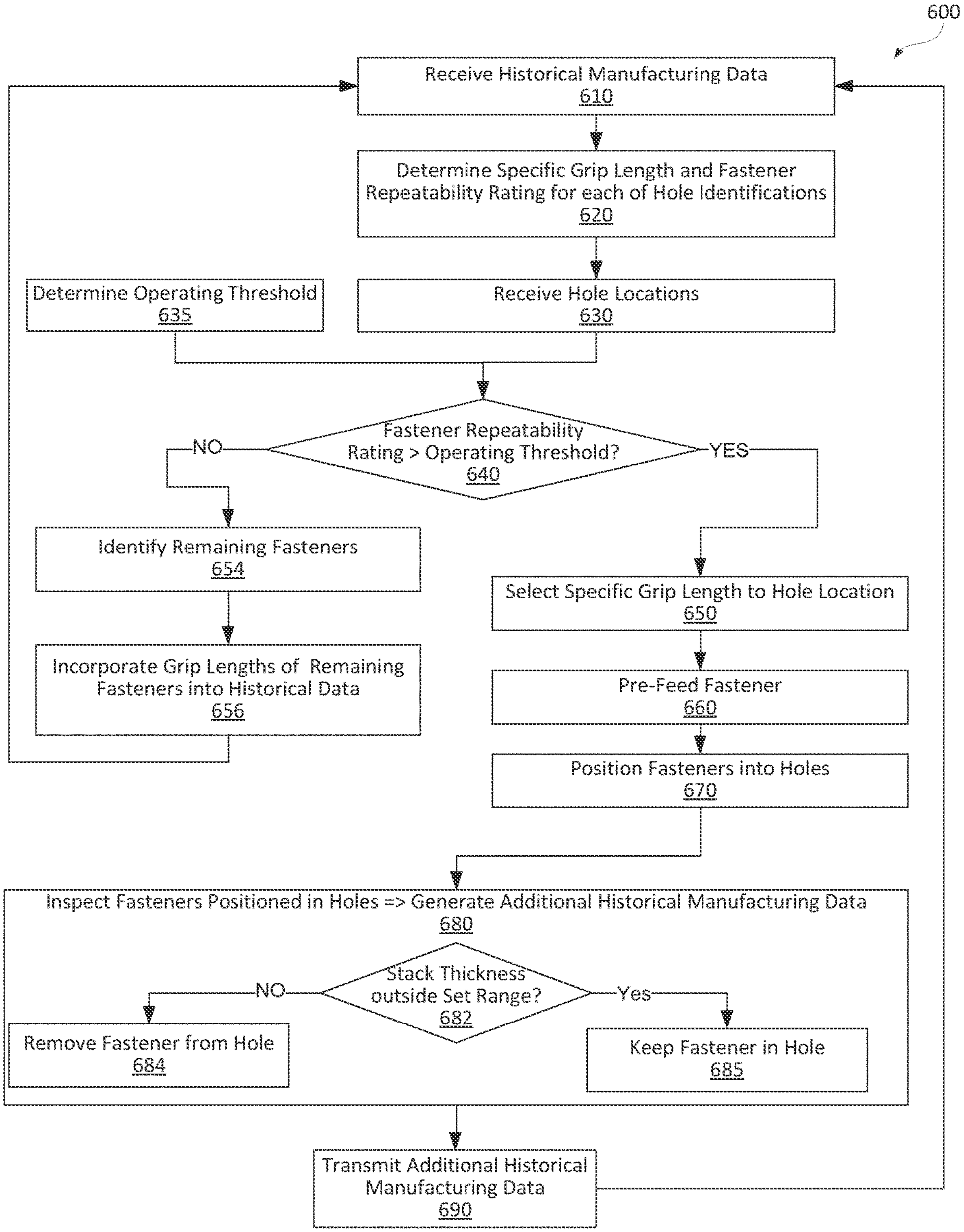
FIG. 6 is a process flowchart corresponding to a method of selecting fasteners for pre-feeding into an automated drilling machine, in accordance with some examples.

FIG. 6 is a process flowchart corresponding to method 600 for selecting fasteners 110 for predictively pre-feeding into automated drilling machine 120. Operations of method 600, presented below, are performed using manufacturing system 100, various examples of which are described above with reference to FIG. 5A and FIG. 56.

In some examples, method 600 comprises receiving historical manufacturing data 150 at manufacturing data center 130 (block 610). As noted above, historical manufacturing data 150 comprises hole identifications 152 and fastener grip lengths 156. Each of fastener grip lengths 156 was previously selected for a corresponding one of hole identifications 152.

Hole identifications 152 correspond, for example, to a particular design (or multiple designs) of previously processed parts, such as aircraft parts or, more specifically, aft body components, other fuselage components, and the like. For example, hole identifications 152 are identified in NC programs based on one or more references (e.g., coordinates). In some examples, fastener identifications are used in addition or instead of fastener grip lengths 156.

It should be noted that fastener grip lengths 156 in historical manufacturing data 150 are different from designed grip lengths, which may be identified in NC programs. As noted above, this discrepancy may be driven by various factors, such as stack thickness variations. In some examples, historical manufacturing data 150 comprises specific flags, each representing a specific variation between fastener grip lengths 156 and designed grip lengths. For example, this flag represents the degree of variation.

In some examples, historical manufacturing data 150 comprises other parameters, such as the date when a specific grip length has been selected for the corresponding hole identification, a serial number of a part for which the specific grip length has been selected, and the like. In some examples, a name of the NC program corresponding to the selected grip length is also provided as a part of historical manufacturing data 150. For example, the same hole identification comprises multiple fastener grip lengths 156, e.g., previously selected for different parts. In some examples, these instances of fastener grip lengths 156 (for the same hole identification) refer to the same fastener grip length. In other words, all holes, corresponding to this hole identification, of different parts received fasteners with the same grip length. In these examples, there are no variations in fastener grip lengths 156, at least for this particular hole identifications. This specific example does not require analysis, and this fastener grip length will be selected for this hole identification.

In other examples, different instances of fastener grip lengths 156 (for the same hole identification but different parts) refer to different fastener grip lengths. In these examples, one of these fastener grip lengths needs to be selected for this hole identification as further described below with reference to the operation represented by block 650. In some examples, various parameters of historical manufacturing data 150 are used as weight coefficients and/or used to determine the weight coefficient. For example, the date of a specific selection instance in historical manufacturing data 150, which may be referred to as a selection date, is used as a weight coefficient (e.g., more selections are assigned higher weights than older selections as the more selections are considered more relevant). Overall, the consistency or diversity of fastener grip lengths in historical manufacturing data 150 affects fastener repeatability rating 177 (for this particular hole identification) as further described below.

In some examples, method 600 comprises determining specific grip length 157 and fastener repeatability rating 177 (block 620). Fastener repeatability rating 177 corresponds to this specific grip length 157. This operation is performed at manufacturing data center 130 based on historical manufacturing data 150. In other words, historical manufacturing data 150 is analyzed at manufacturing data center 130 (e.g., using scoring engine 134, described above with reference to FIG. 5A and FIG. 56) to determine this pair of specific grip length 157 and fastener repeatability rating 177. Furthermore, specific grip length 157 and fastener repeatability rating 177 are determined for each of hole identifications 152, at least for which historical manufacturing data 150 is available.

In some examples, determining specific grip length 157 and fastener repeatability rating 177 for each of hole identifications 152 comprises analyzing fastener grip lengths 156 previously selected for a corresponding one of hole identifications 152. In other words, the analysis is performed on each hole identification individually. More specifically, analyzing fastener grip lengths 156 comprises determining the number of fastener grip lengths 156 previously selected for corresponding one of hole identifications 152. In other words, the analysis involves tallying each fastener grip length (e.g., fasteners having a grip length of 10.0 mm were selected 25 times, fasteners having a grip length of 10.5 mm were selected 50 times, and fasteners having a grip length of 11.0 mm were selected 25 times).

In some examples, each previous selection of fastener grip lengths 156 is assigned a weight coefficient, instead of a unit count. The weight coefficient is selected, for example, based on one or more parameters available in historical manufacturing data 150, e.g., a selection date. The selection date represents when each of fastener grip lengths 156 was selected for corresponding one of hole identifications 152 and is included in historical manufacturing data 150, together with fastener grip lengths 156. For example, a fastener grip length selected earlier is given a lower weight than a fastener grip length selected later. In other words, the most recent data is considered to be more relevant.

In some examples, determining specific grip length 157 and fastener repeatability rating 177 for each of hole identifications 152 comprises applying machine learning to historical manufacturing data 150. For example, machine learning is used to develop and update various models for determining specific grip length 157 and fastener repeatability rating 177. These models are developed and updated based on historical manufacturing data 150 received by manufacturing data center 130. The amount, diversity, and quality of historical manufacturing data 150 drive the accuracy of these models and increase the values of fastener repeatability ratings.

In some examples, method 600 comprises storing specific grip length 157 and fastener repeatability rating 177 for each of hole identifications 152 in operating data store 136 of manufacturing data center 130. More specifically, specific grip length 157 and fastener repeatability rating 177 are parts of operating data 170 generated by scoring engine 134, based on the analysis of historical manufacturing data 150, and stored in operating data store 136. In some examples, operating data 170 is periodically generated, e.g., based on a specific schedule, based on updates to historical manufacturing data 150, based on new models available to scoring engine 134. In some examples, multiple versions of operating data 170 are available at operating data store 136, each associated with different models available to scoring engine 134. When operating data 170 is stored at operating data store 136, method 600 also comprises retrieving specific grip length 157 and fastener repeatability rating 177 for each of hole locations 142 from operating data store 136 of manufacturing data center 130.

In some examples, method 600 comprises receiving holes locations 142 (block 630). Each hole location corresponds to one of hole identifications 152 in historical manufacturing data 150. Each hole locations 142 also correspond to an actual hole in a part being processed in accordance with method 600. It should be noted that, in some examples, historical manufacturing data 150 represents multiple different parts. In these examples, holes locations 142, received in this operation, correspond only to a subset of hole identifications 152.

In some examples, the operation of receiving holes locations 142 is triggered by automated drilling machine 120, e.g., once automated drilling machine 120 receives a numerical control (NC) program from a machine programming device 140. More specifically, receiving hole locations 142 comprises retrieving each of hole locations 142 from the NC program. In some examples, receiving hole locations 142 comprises retrieving a cached table, comprising each of hole locations 142 and corresponding to the NC program from operating data store 136.

In some examples, method 600 comprises determining operating threshold 178 (block 635) based on at least one of the set yield, a cost of a part receiving fasteners 110, or a process cost of installing fasteners 110. For example, a higher yield corresponds to a higher level of operating threshold 178. Similarly, a higher level of operating threshold 178 is selected for more expensive parts. In some examples, operating threshold 178 is determined at manufacturing data center 130. For example, operating data store 136 comprises a table of different values of operating threshold 178 for different types of parts, hole locations, and the like. In some examples, operating threshold 178 differs for at least two hole locations 142. Alternatively, all hole locations of the same part have the same value of operating threshold 178.

In some examples, method 600 comprises selecting specific grip length 157 for each of hole locations 142 (block 650). As reflected by decision block 640, specific grip length 157 is selected for the corresponding one of hole locations 142 only when fastener repeatability rating 177, corresponding to this specific grip length 157, exceeds operating threshold 178. When fastener repeatability rating 177 does not exceed operating threshold 178, specific grip length 157 is not selected for this hole location. Instead, specific grip length 157 is determined using other techniques, as described below with reference to block 654. Additional detail of this selecting operation is presented above with reference to FIG. 4A and FIG. 4B.

In some examples, the operations corresponding to block 630 and block 650 are performed at manufacturing data center 130. More specifically, these operations are performed by selection module 124, which is a part of manufacturing data center 130 in these examples. Furthermore, in these examples, method 600 further comprises transmitting specific grip length 157, selected for each of hole locations 142, to automated drilling machine 120. Alternatively, the operations corresponding to block 630 and block 650 are performed at automated drilling machine 120. In these alternative examples, selection module 124, which performs these operations, is a part of automated drilling machine 120.

In some examples, method 600 comprises generating an XML file comprising hole locations 142 and specific grip length 157 for each of hole locations 142, at least for hole locations 142 where fastener repeatability rating 177 exceeds operating threshold 178. In these examples, method 600 also comprises transmitting the XML file to automated drilling machine 120 and loading the XML file to machine controller 122 of automated drilling machine 120. Machine controller 122 uses this XML file for pre-feeding fasteners as, e.g., described below with reference to block 660.

In some examples, method 600 comprises identifying remaining fasteners 123 for all remaining ones of hole locations 142 (block 654). For each of these remaining hole locations, fastener repeatability rating 177 was below operating threshold 178. As such, specific grip length 157 could not be selected during the operation represented by block 650 and decision block 640. The operating of identifying remaining fasteners 123 involves, for example, measuring the stack thickness at each of these remaining hole locations and selecting specific grip length 157 based on this measurement. Alternatively, remaining fasteners 123 are identified from the NC program, e.g., as a designed grip length.

Method 600 then comprises incorporating fastener grip lengths 156 of remaining fasteners 123 into historical manufacturing data 150 (block 656). This data is newly learned data, which helps to improve the predictive model used by manufacturing data center 130. For example, incorporating this data increases the value of fastener repeatability rating 177, e.g., if the same fastener grip length is repeatedly being used for this hole location.

In some examples, method 600 comprises pre-feeding fasteners 110 at automated drilling machine 120 (block 660). Fasteners 110 are selected for pre-feeding based on specific grip length 157 for each of hole locations 142. In some examples, all required fasteners are pre-fed at this operation, e.g., when fastener repeatability rating exceeds operating threshold 178 for all hole locations. Alternatively, a subset of fasteners is not pre-fed. In some examples, operating threshold 178 is adjusted if the number of fasteners that are not pre-fed is large (e.g., greater than 50% of all fasteners).

In some examples, method 600 comprises positioning fasteners 110, pre-fed into automated drilling machine 120 into holes, corresponding to hole locations 142 (block 670). This operation is performed by automated drilling machine 120, e.g., based on the NC program provided to machine controller 122.

In some examples, method 600 comprises inspecting fasteners 110, positioned into holes corresponding to hole locations 142 (block 680). This operation generates additional historical manufacturing data 151. In some examples, inspecting fasteners 110, positioned into holes, comprises measuring a stack thickness at each of hole locations 142. In some examples, method 600 or, more specifically, the fastener inspection operation (block 680) comprises removing (block 684) one of fasteners 110, positioned into the corresponding hole. This removal operation is performed when (decision block 682) the stack thickness, corresponding to this fastener, is outside of a set range. If a fastener is removed, this instance is also reflected in additional historical manufacturing data 151. Otherwise, the fastener is kept in the hole (block 685).

In some examples, method 600 comprises transmitting additional historical manufacturing data 151 to manufacturing data center 130 (block 690). More specifically, additional historical manufacturing data 151 is integrated into historical manufacturing data 150 as new learning data. As such, in some examples, predictive models used by manufacturing data center 130 are continuously trained.

Figures 7A, 7B:
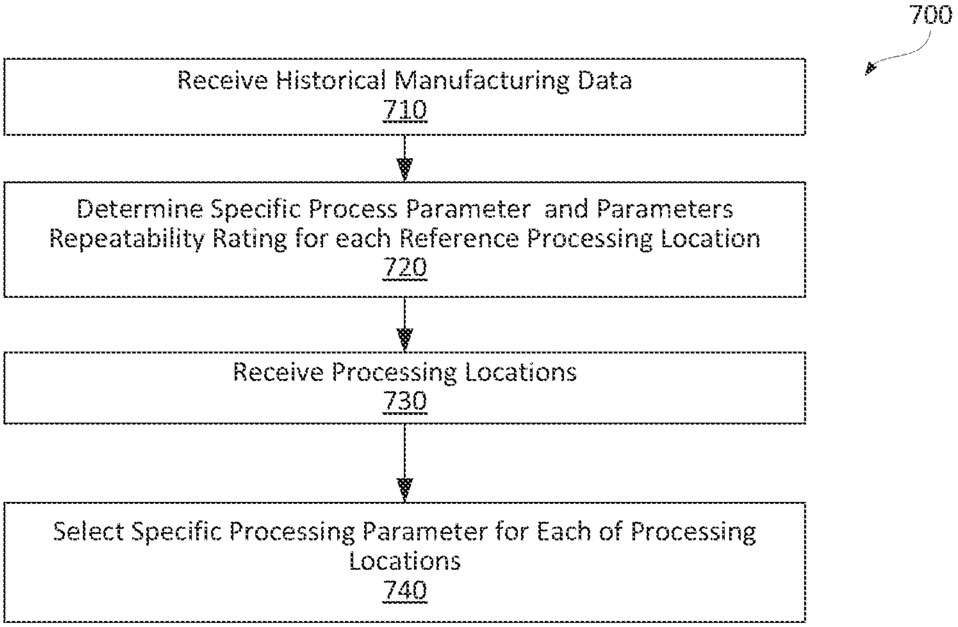
FIG. 7A is a process flowchart corresponding to a method of selecting processing parameters for an automated machine, in accordance with some examples.
FIG. 7B is a schematic illustration of generating operating data based on historical manufacturing data using the method of FIG. 7A, in accordance with some examples.

FIG. 7A is a process flowchart corresponding to method 700 for selecting processing parameters for operating automated machine 121, in accordance with some examples. Various aspects of method 600, described above, are also applicable to method 700. In some examples, method 700 is a generalized version of method 600. It should be explicitly noted, however, that in examples any possibilities and permutations described above with respect to method 600 may equally apply to method 700. Method 700 applies to automated machine 121, one example of which is automated drilling machine 120.

In some examples, method 700 comprises receiving historical manufacturing data 150 (block 710). Historical manufacturing data 150 is received at a manufacturing data center 130 and comprises reference processing locations 162 and reference processing parameters 166 as, for example, is schematically shown in FIG. 7B. Each of reference processing parameters 166 has been previously selected for a corresponding one of reference processing locations 162. This operation generally corresponds to the operation represented by block 610 and described above.

In some examples, method 700 comprises determining specific processing parameter 167 and parameter repeatability rating 169 for each of reference processing locations 162 (block 720). Specific processing parameter 167 and parameter repeatability rating 169 are determined from historical manufacturing data 150 as, for example, is schematically shown in FIG. 7B. It should be noted that parameter repeatability rating 169 corresponds to specific processing parameter 167. This operation generally corresponds to the operation represented by block 620 and described above.

In some examples, method 700 comprises receiving processing locations 163, each corresponding to one of reference processing locations 162 (block 730). For example, processing locations 163 are identified in an NC program. Processing locations 163 are received at either manufacturing data center 130 or automated machine 121. This operation generally corresponds to the operation represented by block 630 and described above.

In some examples, method 700 comprises selecting specific processing parameter 167 for each of processing locations 163 (block 740). For example, specific processing parameter 167 has a corresponding repeatability rating. This repeatability rating is compared to an operating threshold, similar to the operations corresponding to block 640 and block 650. However, other examples of selecting specific processing parameter 167 are also within the scope. Various examples of specific processing parameter 167 are within the scope. In one example, specific processing parameter 167 is a specific grip length of fasteners. This example is described above with reference to FIG. 6. In a more general example, specific processing parameter 167 is a specific component, selected for processing. Other examples of specific processing parameter 167 include, but are not limited to, fastener installation parameters (e.g., riveting parameters), welding parameters, and the like. Examples of processing locations 163 include specific coordinates, e.g., used by automated machine 121. These coordinates are provided, for example, using an NC program.

Computer System Examples

Figure 8:
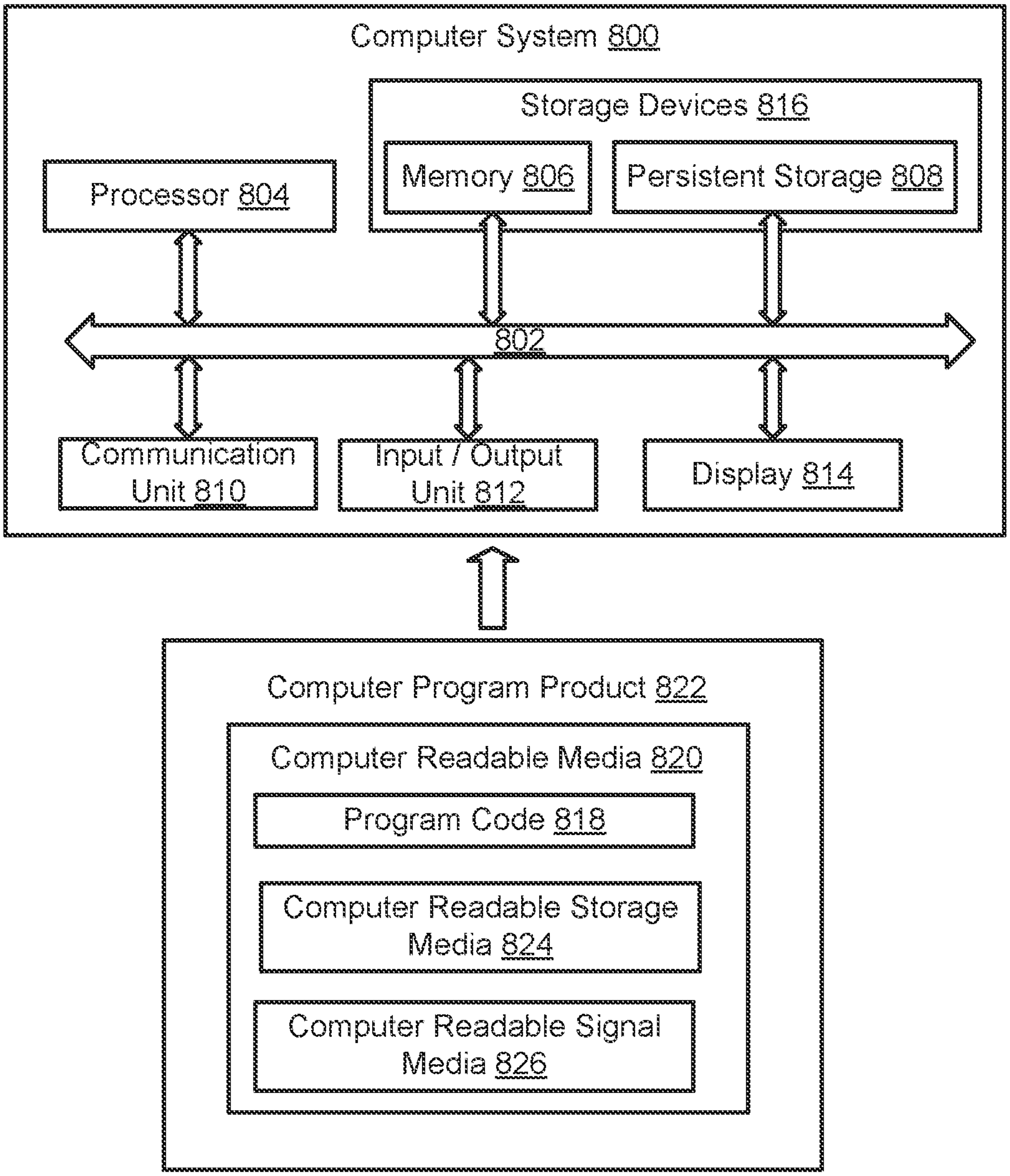
FIG. 8 is a schematic illustration of a computer system, which is operable as one or more parts of a manufacturing data center and/or of an automated drilling machine, in accordance with some examples.

Turning now to FIG. 8, an illustration of a data processing system 800 is depicted, in accordance with some examples. Data processing system 800 is used to implement one or more computers used in a controller or other components of various systems described above, such as scoring engine 134, selection module 124, machine controller 122, and the like. In some examples, data processing system 800 includes communications framework 802, which provides communications between processor unit 804, memory 806, persistent storage 808, communication unit 810, input/output unit 812, and display 814. In this example, communication framework 802 takes the form of a bus system.

Processor unit 804 serves to execute instructions for software that is loaded into memory 806. In some examples, processor unit 804 is a collection of processors, a multi-processor core, or some other type of processor, depending on the particular implementation.

Memory 806 and persistent storage 808 are examples of storage devices 816. A storage device is any piece of hardware that is capable of storing information, for example, and without limitation, data, program code in functional form, and/or other suitable information either on a temporary basis and/or a permanent basis. Storage devices 816 are referred to as computer-readable storage devices in these illustrative examples. Memory 806 is a random access memory or any other suitable volatile or non-volatile storage device. Persistent storage 808 takes various forms, depending on the particular implementation. For example, persistent storage 808 contains one or more components or devices, such as a hard drive, a flash memory, a rewritable optical disk, a rewritable magnetic tape, or some combination of the above. In some examples, the media used by persistent storage 808 is removable. For example, a removable hard drive is used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that are connected to data processing system 800. For example, input/output unit 812 provides a connection for user input through a keyboard, a mouse, and/or some other suitable input device. Further, input/output unit 812 sends output to a printer. Display 814 provides a mechanism to display information to a user.

Instructions for the operating system, applications, and/or programs are located in storage devices 816, which are in communication with processor unit 804 through communications framework 802. The processes of the different examples are performed by processor unit 804 using computer-implemented instructions, which are located in a memory, such as memory 806.

These instructions are referred to as program code, computer usable program code, or computer-readable program code that is read and executed by a processor in processor unit 804. The program code in the different examples is embodied on different physical or computer-readable storage media, such as memory 806 or persistent storage 808.

Program code 818 is located in a functional form on computer-readable media 820 that is selectively removable and is loaded onto or transferred to data processing system 800 for execution by processor unit 804. Program code 818 and computer-readable media 820 are parts of or form computer program product 822 in these illustrative examples. In one example, computer-readable media 820 is computer-readable storage media 824 or computer-readable signal media 826.

In these illustrative examples, computer-readable storage media 824 is a physical or tangible storage device used to store program code 818 rather than a medium that propagates or transmits program code 818.

Alternatively, program code 818 is transferred to data processing system 800 using computer readable signal media 826. Computer-readable signal media 826 is, for example, a propagated data signal containing program code 818. For example, computer-readable signal media 826 is an electromagnetic signal, an optical signal, and/or any other suitable type of signal. These signals are transmitted over communications links, such as wireless communications links, optical fiber cable, coaxial cable, a wire, and/or any other suitable type of communications link.

The different components illustrated for data processing system 800 are not meant to provide architectural limitations to the manner in which different examples are implemented.

The different illustrative examples are implemented in a data processing system including components in addition to and/or in place of those illustrated for data processing system 800. Other components, which are shown in FIG. 8, can be varied from the illustrative examples shown. The different examples are implemented using any hardware device or system capable of running program code 818.

Aircraft Examples

In some examples, methods and systems described above are used on aircraft and, more generally, by the aerospace industry. Specifically, these methods and systems can be used during the fabrication of aircraft as well as during aircraft service and maintenance.

Figure 9:
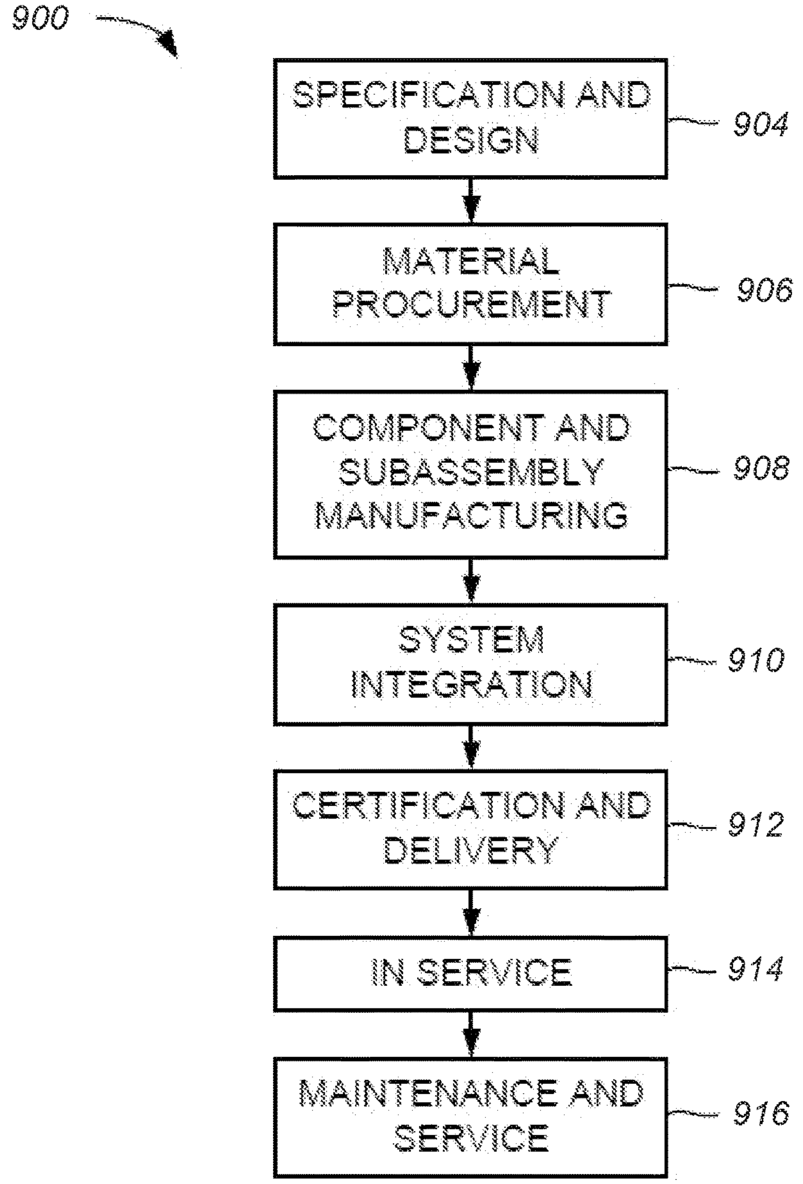
FIG. 9 is a process flowchart corresponding to a method for manufacturing and servicing the aircraft.
Figure 10:
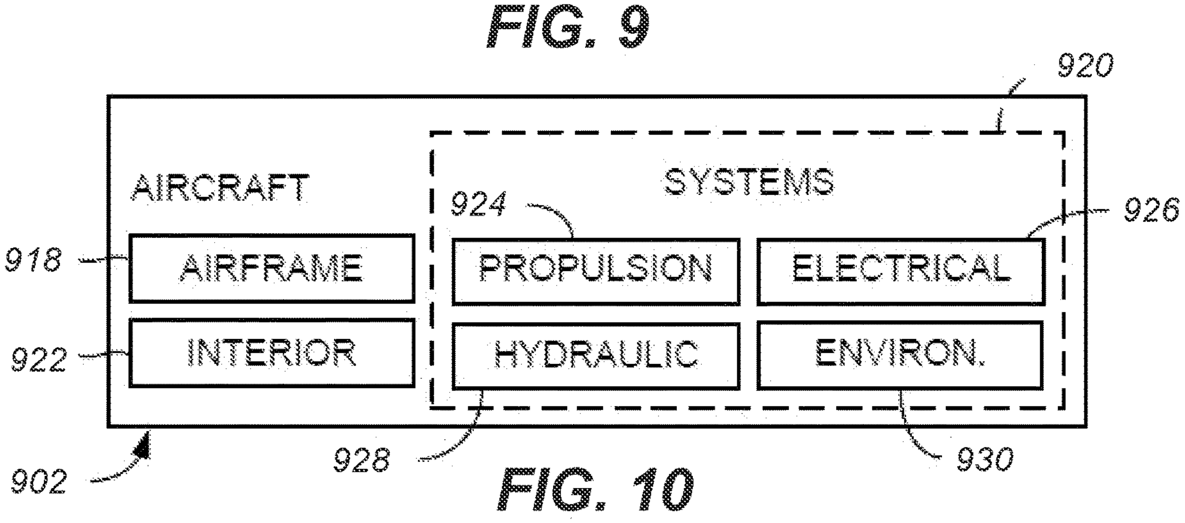
FIG. 10 illustrates a block diagram of an example aircraft, in accordance with some examples.

Accordingly, the apparatus and methods described above are applicable for aircraft manufacturing and service method 900 as shown in FIG. 9 and for aircraft 902 as shown in FIG. 10. During pre-production, method 900 includes specification and design 904 of aircraft 902 and material procurement 906. During production, component, and subassembly manufacturing 908 and system integration 910 of aircraft 902 takes place. Thereafter, aircraft 902 goes through certification and delivery 912 in order to be placed in service 914. While in service by a customer, aircraft 902 is scheduled for routine maintenance and service 916, which also includes modification, reconfiguration, refurbishment, and so on.

In some examples, each of the processes of method 900 is performed or carried out by a system integrator, a third party, and/or an operator, e.g., a customer. For the purposes of this description, a system integrator includes without limitation any number of aircraft manufacturers and major-system subcontractors; a third party includes without limitation any number of vendors, subcontractors, and suppliers; and an operator can be an airline, leasing company, military entity, service organization, and so on.

As shown in FIG. 9, aircraft 902 produced by method 900 includes airframe 918 with plurality of systems 920 and interior 922. The airframe 918 includes the wings of the aircraft 902. Examples of systems 920 include one or more of propulsion system 924, electrical system 926, hydraulic system 928, and environmental system 930. Any number of other systems can be included.

Apparatus and methods presented herein can be employed during any one or more of the stages of method 900. For example, components or subassemblies corresponding to manufacturing 908 are fabricated or manufactured in a manner similar to components or subassemblies produced while aircraft 902 is in service. Also, one or more apparatus examples, method examples, or a combination thereof are utilized during manufacturing 908 and system integration 910, for example, by substantially expediting assembly of or reducing the cost of an aircraft 902. Similarly, one or more apparatus examples, method examples, or a combination thereof are utilized while aircraft 902 is in service, for example, and without limitation, to maintenance and service 916.

FURTHER EXAMPLES

Further, the description includes examples according to the following clauses:

Clause 1. A method for selecting fasteners for predictively pre-feeding into an automated drilling machine, the method comprising:

at a manufacturing data center receiving historical manufacturing data comprising hole identifications and fastener grip lengths, each of the fastener grip lengths previously selected for a corresponding one of the hole identifications;

at the manufacturing data center determining, from the historical manufacturing data and for each of the hole identifications, a specific grip length of the fastener grip lengths and a fastener repeatability rating, corresponding to the specific grip length;

receiving holes locations, each corresponding to one of the hole identifications; and selecting, for each of the hole locations, the specific grip length when the fastener repeatability rating, corresponding to the specific grip length, exceeds an operating threshold.

Clause 2. The method of clause 1, further comprising predictively pre-feeding the fasteners, selected based on the specific grip length for each of the hole locations, at the automated drilling machine.

Clause 3. The method of clause 2, further comprising:

positioning the fasteners, pre-fed into the automated drilling machine into holes, corresponding the hole locations;

inspecting the fasteners, positioned into the holes corresponding to the hole locations, thereby generating additional historical manufacturing data; and transmitting the additional historical manufacturing data to the manufacturing data center.

Clause 4. The method of clause 3, wherein inspecting the fasteners, positioned into the holes, comprises measuring a stack thickness at each of the hole locations.

Clause 5. The method of clause 4, further comprising removing one of the fasteners, positioned into a corresponding one of the holes, when the stack thickness, corresponding to the one of the fasteners, is outside of a set range.

Clause 6. The method of any one of clauses 1-5, wherein receiving the holes locations and selecting the specific grip length for each of the hole locations are performed at the manufacturing data center.

Clause 7. The method of clause 6, further comprising transmitting the specific grip length, selected for each of the hole locations, to the automated drilling machine.

Clause 8. The method of any one of clauses 1-5, wherein receiving the holes locations and selecting the specific grip length for each of the hole locations are performed at the automated drilling machine.

Clause 9. The method of any one of clauses 1-8, wherein determining the specific grip length and the fastener repeatability rating for each of the hole identifications comprises analyzing the fastener grip lengths previously selected for a corresponding one of the hole identifications.

Clause 10. The method of clause 9, wherein analyzing the fastener grip lengths, previously selected for the corresponding one of the hole identifications, comprises determining the number of each of the fastener grip lengths previously selected for the corresponding one of the hole identifications.

Clause 11. The method of clause 10, wherein the number of each of the fastener grip lengths previously selected for the corresponding one of the hole identifications is assigned a weight coefficient, selected based on one or more parameters.

Clause 12. The method of clause 11, wherein the one or more parameters comprise a selection date when each of the fastener grip lengths was selected for the corresponding one of the hole identifications.

Clause 13. The method of any one of clauses 1-12, wherein determining the specific grip length and the fastener repeatability rating for each of the hole identifications comprises applying machine learning to the historical manufacturing data.

Clause 14. The method of any one of clauses 1-13, further comprising determining the operating threshold based on at least one of a set yield, a cost of a part receiving the fasteners, or a process cost of installing the fasteners.

Clause 15. The method of any one of clauses 1-14, wherein the operating threshold differs for at least two of the hole locations.

Clause 16. The method of any one of clauses 1-14, further comprising:

identifying remaining fasteners for all remaining ones of the hole locations, for which the fastener repeatability rating is below the operating threshold; and incorporating the fastener grip lengths of the remaining fasteners into the historical manufacturing data.

Clause 17. The method of any one of clauses 1-16, wherein receiving the holes locations is triggered by the automated drilling machine once the automated drilling machine receives a numerical control program from a machine programming device.

Clause 18. The method of clause 17, wherein receiving the hole locations comprises retrieving each of the hole locations from the numerical control program.

Clause 19. The method of clause 17, wherein receiving the hole locations comprises retrieving a cached table, comprising each of the hole locations and corresponding to the numerical control program.

Clause 20. The method of any one of clauses 1-19, further comprising:

storing the specific grip length and the fastener repeatability rating for each of the hole identifications in an operating data store of the manufacturing data center, and retrieving the specific grip length and the fastener repeatability rating for each of the hole locations from the operating data store of the manufacturing data center.

Clause 21. The method of any one of clauses 1-20, further comprising:

generating an extensible markup language file comprising the specific grip length for each of the hole locations for which the fastener repeatability rating, corresponding the specific grip length, exceeds the operating threshold;

transmitting the extensible markup language file to the automated drilling machine; and loading the extensible markup language file to a machine controller of the automated drilling machine.

Clause 22. A method for selecting processing parameters for operating an automated machine, the method comprising:

at a manufacturing data center receiving historical manufacturing data comprising reference processing locations and reference processing parameters, each of the reference processing parameters previously selected for a corresponding one of the reference processing locations;

at the manufacturing data center determining, from the historical manufacturing data and for each of the reference processing locations, a specific processing parameter of the reference processing parameters and a parameter repeatability rating, corresponding to the specific processing parameter;

receiving processing locations, each corresponding to one of the reference processing locations; and selecting the specific processing parameter for each of the processing locations when the parameter repeatability rating, corresponding to the specific processing parameter, exceeds an operating threshold.

Clause 23. The method of clause 22, wherein selecting the specific processing parameter comprises comparing the repeatability rating, corresponding to specific processing parameter to the operating threshold, wherein the operating threshold is based on at least one of a set yield, a cost of a part, or a process cost.

Clause 24. A manufacturing system comprising:

a manufacturing data center, comprising:

a historical data store, configured to receive and store historical manufacturing data from an automated drilling machine, the historical manufacturing data comprising hole identifications and fastener grip lengths, each of the fastener grip lengths previously selected for a corresponding one of the hole identifications;

a scoring engine, configured to determine, from the historical manufacturing data and for each of the hole identifications, a specific grip length of the fastener grip lengths and a fastener repeatability rating, corresponding to the specific grip length; and an operating data store, configured to store the specific grip length and the fastener repeatability rating for each of the hole identifications.

Clause 25. The manufacturing system of clause 24, further comprising a selection module, configured to receive holes locations, each corresponding to one of the hole identifications, and to select, for each of the hole locations, the specific grip length when the fastener repeatability rating, corresponding the specific grip length, exceeds an operating threshold.

Clause 26. The manufacturing system of clause 25, wherein the selection module is a part of the manufacturing data center and is configured to transmit the specific grip length, selected for each of the hole locations, to the automated drilling machine.

Clause 27. The manufacturing system of any one of clauses 24-26, further comprising the automated drilling machine, configured to predictively pre-feed fasteners, corresponding to the specific grip length, for each of the hole identifications.

CONCLUSION

Although the foregoing concepts have been described in some detail for purposes of clarity of understanding, it will be apparent that certain changes and modifications may be practiced within the scope of the appended clauses. It should be noted that there are many alternative ways of implementing the processes, systems, and apparatus. Accordingly, the present examples are to be considered illustrative and not restrictive.

What is claimed is:

1. A method for selecting fasteners for predictively pre-feeding into an automated drilling machine, the method comprising:

receiving, at a manufacturing data center, historical manufacturing data comprising hole identifications and fastener grip lengths, each of the fastener grip lengths previously selected for a corresponding one of the hole identifications;

determining, at the manufacturing data center, from the historical manufacturing data and for each of the hole identifications, a specific grip length of the fastener grip lengths and a percentage of uses of the fastener as indicated in the historical data, corresponding to the specific grip length;

receiving holes locations, each corresponding to one of the hole identifications;

selecting, for each of the hole locations, the specific grip length when the percentage of uses of a fastener, corresponding to the specific grip length, exceeds an operating threshold; and predictively pre-feeding the fasteners, selected based on a specific grip length for each of the hole locations, at the automated drilling machine.

2. The method of claim 1, wherein the percentage of uses of the fastener for each of the hole identifications relates to: the number of the fastener grip lengths previously selected for a corresponding one of the hole identification, an amount of the historical manufacturing data, a diversity of the historical manufacturing data, and/or quality of the historical manufacturing data.

3. The method of claim 1, further comprising:

positioning the fasteners, pre-fed into the automated drilling machine into holes, corresponding to the hole locations;

inspecting the fasteners, positioned into the holes corresponding to the hole locations, thereby generating additional historical manufacturing data; and transmitting the additional historical manufacturing data to the manufacturing data center.

4. The method of claim 3, wherein inspecting the fasteners, positioned into the holes, comprises measuring a stack thickness at each of the hole locations.

5. The method of claim 4, further comprising removing one of the fasteners, positioned into a corresponding one of the holes, when the stack thickness, corresponding to the one of the fasteners, is outside of a set range.

6. The method of claim 1, wherein receiving the holes locations and selecting the specific grip length for each of the hole locations is performed at the manufacturing data center.

7. The method of claim 6, further comprising transmitting the specific grip length, selected for each of the hole locations, to the automated drilling machine.

8. The method of claim 1, wherein receiving the holes locations and selecting the specific grip length for each of the hole locations is performed at the automated drilling machine.

9. The method of claim 1, wherein determining the specific grip length and the percentage of uses of the fastener for each of the hole identifications comprises analyzing the fastener grip lengths previously selected for a corresponding one of the hole identifications.

10. The method of claim 9, wherein analyzing the fastener grip lengths, previously selected for the corresponding one of the hole identifications, comprises determining a number of each of the fastener grip lengths previously selected for the corresponding one of the hole identifications.

11. The method of claim 10, wherein the number of each of the fastener grip lengths previously selected for the corresponding one of the hole identifications is assigned a weight coefficient, selected based on one or more parameters.

12. The method of claim 11, wherein the one or more parameters comprise a selection date when each of the fastener grip lengths was selected for the corresponding one of the hole identifications.

13. The method of claim 1, wherein determining the specific grip length and the f percentage of uses of the fastener for each of the hole identifications comprises applying machine learning to the historical manufacturing data.

14. The method of claim 1, further comprising determining the operating threshold based on at least one of a set yield, a cost of a part receiving the fasteners, or a process cost of installing the fasteners.

15. The method of claim 1, wherein the operating threshold differs for at least two of the hole locations.

16. The method of claim 1, further comprising:

identifying remaining fasteners for all remaining ones of the hole locations for which the percentage of uses of the fastener is below the operating threshold; and incorporating the fastener grip lengths of the remaining fasteners into the historical manufacturing data.

17. The method of claim 1, wherein receiving the holes locations is triggered by the automated drilling machine once the automated drilling machine receives a numerical control program from a machine programming device.

18. A manufacturing system that comprises a manufacturing data center, that comprises:

a historical data store, configured to receive and store a historical manufacturing data from an automated drilling machine, the historical manufacturing data comprising hole identifications and fastener grip lengths, each of the fastener grip lengths previously selected for a corresponding one of the hole identifications;

at least one processor configured to determine, from the historical manufacturing data and for each of the hole identifications, a specific grip length of the faster grip lengths and a percentage of uses of a fastener as indicated in the historical data, corresponding to the specific grip length; and an operating data store, configured to store the specific grip length and the fastener repeatability rating for each of the hole identifications, wherein the at least one processor is further configured to receive holes locations, each corresponding to one of the hole identifications, and to cause, for each of the hole locations, the specific grip length to be pre-fed into the automated drilling machine when the percentage of uses of the fastener, corresponding to the specific grip length, exceeds an operating threshold.

19. The manufacturing system of claim 18, wherein the at least one processor is further configured to receive hole locations, each corresponding to one of the hole identifications, and to select, for each of the hole locations, the specific grip length when the percentage of uses of the fastener, corresponding to the specific grip length, exceeds an operating threshold.

20. The manufacturing system of claim 19, wherein the at least one processor is configured to transmit the specific grip length, selected for each of the hole locations, to the automated drilling machine.

* * * * *